United States Patent Office 3,501,439
Patented Mar. 17, 1970

3,501,439
PROCESS OF MAKING CYANO-SUBSTITUTED POLYVINYL ACETALS
Faber B. Jones, Nowata, and Donald G. Kuper, Bartlesville, Okla., assignors to Phillips Petroleum Company, a corporation of Delaware
No Drawing. Filed July 3, 1967, Ser. No. 650,617
Int. Cl. C08f 27/08
U.S. Cl. 260—73                                    13 Claims

ABSTRACT OF THE DISCLOSURE

Cyano-substituted polyvinyl acetals are produced by admixing polyvinyl alcohol with cyano aldehydes or cyano acetals in the presence of an acid catalyst at a temperature within the range of about 0 to 200° C. These cyano-substituted polyvinylacetals are useful as adhesives, coatings, films, specialty dielectrics, and the like.

---

This invention relates to cyano-substituted polyvinyl acetals. In one aspect it relates to a method for preparing cyano-substituted polyvinyl acetals. In another aspect it relates to the cyano-substituted polyvinyl acetals so produced. In another aspect it relates to the use of the cyano-substituted polyvinyl acetals or matrices for electrical luminescent devices or as bonding agents.

An object of the invention is to produce cyano-substituted polyvinyl acetals.

Another object of this invention is to provide a method for the production of cyano-substituted polyvinyl acetals.

Another object of this invention is to provide a new matrix or electrical luminescent devices.

Another object of this invention is to provide a novel bonding agent.

Other objects and advantages of this invention will be apparent to one skilled in the art from a study of the following description and appended claims.

According to the present invention we have found that cyano-substituted polyvinyl acetals can be produced by admixing polyvinyl alcohol and a cyano compound having the general formula $XCHR_nCN$ where X is selected from oxygen and $(R'O)_2$, $n$ is 0 or 1, R is a divalent hydrocarbon radical selected from the group consisting of unsubstituted and alkyl-, cycloalkyl-, and aryl-substituted alkylene, cycloalkylene, arylene, alkylene, and cycloalkenylene, including alkylene in which 1 methylene group is replaced by a cycloalkylene or arylene group, said R contains from 1 to about 16 carbon atoms, inclusive, and said R' is selected from the group consisting of alkyl, cycloalkyl, aryl, and combinations thereof such as alkaryl, aralkyl, and the like, said R' containing from 1 to about 8 carbon atoms, inclusive, in the presence of an acid catalyst selected from the group consisting of mineral and organic acids. The reaction mixture so formed is maintained at a temperature within the range of about 0 to 200° C. and at a pressure sufficient to maintain the reaction mixture substantially in a liquid phase.

Further according to the invention, we have found desirable results when employing a solvent which is admixed with the other starting materials. Preferably, the solvent is one in which the cyano-substituted polyvinyl acetal is soluble.

Further according to the invention we have found that the cyano-substituted polyvinyl acetals are useful as matrices for electroluminescent devices. Further according to the invention we have found that the cyano-substituted polyvinyl acetals are useful as bonding agents.

The cyano compounds represented by the formula $XCHR_nCN$ as defined above which can be employed in the present invention are cyano aldehydes and cyano acetals. Applicable cyano aldehydes include those which can be represented by the formula $OHCR_nCN$, where $n$ and R are as defined above.

The cyano acetals which can be employed in the preparation of the cyano-substituted polyvinyl acetals of the present invention include those having the formula $$(R'O)_2CHR_nCN$$

where $n$ and R are as defined above, and each R' is selected from the group consisting of alkyl, cycloakyl, aryl, and combinations thereof such as alkaryl, aralkyl, and the like, and the total number of carbon atoms in R' is from 1 to about 8, inclusive.

Examples of cyano aldehydes which can be used in the process of this invention include glyoxylonitrile, cyanoacetaldehyde, 2 - cyanopropionaldehyde, 3 - cyanopropionaldehyde, 4-cyanobutyraldehyde, 6-cyanohexanal, 2-cyano-3-methyl-4-ethyldecanal, 17-cyanoheptadecanal, 2-cyclohexyl-4-cyanovaleraldehyde, 2 - phenyl-3-cyanoheptanal, 5-cyanocyclooctanecarboxaldehyde, 2-methyl-4-cyanocyclohexanecarboxaldehyde, 3-cyclopentyl-5-cyanocyclohexanecarboxaldehyde, 2-phenyl - 4 - cycanocyclopentanecarboxaldehyde, 3 - cyanobenzaldehyde, 3 - cyano-p-tolualdehyde, 3-cyclopentyl-5-cyanobenzaldehyde, 2-phenyl-5-cyanobenzaldehyde, 4-cyanocrotonaldehyde, 4-methyl-5-cyano-2-pentenal, 2-cyclopentyl - 5 - cyano-3-hexenal, 3-phenyl-6-cyano-4-octenal, 4-cyano-cyclohexene - 1 - carboxaldehyde, 3 - methyl-5-cyano-2-cyclohexene-1-carboxaldehyde, 3-cyclopentyl-4-cyano-2-cyclopentene-1-carboxaldehyde, 3 - phenyl-6-cyano-4-cyclooctene-1-carboxaldehyde, 4-(cyanomethyl)cyclohexaneacetaldehyde, 2-(2-cyanoethyl)phenylacetaldehyde, and the like.

Examples of cyano acetals which can be used in the process of this invention include the dimethyl acetal, diethyl acetal, dipropyl acetal, diisopropyl acetal, dibutyl acetal, di-sec-butyl acetal, dihexyl acetal, dioctyl acetal, dicyclohexyl acetal, diphenyl acetal, dibenzyl acetal, di-p-tolyl acetal, and methyl phenyl acetal of the cyano aldehydes named above, and the like.

The polyvinyl alcohols suitable for use in this invention include polymers having hydroxyl groups directly attached to the carbon chain of the polymer wherein at least 90 percent by weight of the polymer consists of vinyl alcohol units having the structure $—CH_2CHOH—$, i.e. polyvinyl alcohol polymers in which 45 to 50 percent of the carbon atoms of the polymer chain are attached to hydroxyl groups. Such polymers can be readily produced from the corresponding polyvinyl ester, for example polyvinyl acetate, by alkaline or acid hydrolysis.

The acid catalyst employed in the present invention can be any strong acid capable of effecting acetalization of the polyvinyl alcohol. Desirable results can be obtained when the catalyst is either a mineral acid such as sulfuric acid, hydrochloric acid, or phosphoric acid, or an organic acid such as trichloroacetic acid, benzenesulfonic acid, or p-toluenesulfonic acid.

While the ratio of cyano aldehyde or cyano acetal to polyvinyl alcohol can vary over a broad range, depending in part on the desired degree of acetalization of the polyvinyl alcohol, desirable results are obtained wherein the cyano aldehyde or cyano acetal is employed in an amount such as to provide about 0.3 to about 1.5 mols of the cyano aldehyde or cyano acetal for each mol of $—CH_2CHOH—$ unit in the polyvinyl alcohol. Especially desired results are obtained wherein about 0.4 to about 0.7 mol of the cyano aldehyde or cyano acetal for each mol of $—CH_2CHOH—$ unit in the polyvinyl alcohol is employed.

The amount of acid catalyst used is not critical. However, it is generally desirable that the amount of acid catalyst be within the range of about 0.5 to 10 weight percent of the aldehyde or acetal employed. The reaction temperature can vary over a wide range, but will generally be within the range of about 0–200° C., usually being within the range of about 20–150° C. The reaction time can vary considerably, depending in part on the reaction temperature and the nature of the reactants, but will generally be within the range of about 5 minutes to about 48 hours, usually being within the range of about 30 minutes to about 24 hours.

The reaction of the present invention can be carried out in the presence or absence of added solvent. However, desirable results have been obtained wherein a solvent in which the cyano-substituted polyvinyl acetal is soluble was employed. Solvents which can be employed in the practice of the present invention include nitro compounds having 1 to about 8 carbon atoms, N-hydrocarbyl amides and N,N-dihydrocarbyl amides having 2 to about 12 carbon atoms, and ethers having about 4 to 16 carbon atoms, inclusive. Examples of solvents which can be employed in the present invention include nitro compounds such as nitromethane, nitroethane, 2-nitropropane, 2-nitro-3-methylpentane. 1-nitrooctane, nitrocyclohexane, 1-nitro-3-methylcyclopentane, nitrobenzene, o-nitrotoluene, and 2-nitro-m-xylene. N-hydrocarbyl amides and N,N-dihydrocarbyl amides which can be employed as solvents when practicing the present invention include N-methylformamide, N,N-dimethylformamide, N,N-diethylacetamide, N-phenylformamide, N-methyl-N-cyclohexylpropionamide, N,N-dibutylbutyramide, pyrrolidone, N-methylpyrrolidone, and epsilon-caprolactam. Ethers which can be employed as solvents in the present invention include anisole, diphenyl ether, tetrahydrofuran, dioxane, dimethyl ether of ethylene glycol, diethyl ether of diethylene glycol, dipropyl ether of triethylene glycol, and dibutyl ether of tetraethylene glycol.

While any of the above mentioned solvents can be employed in the practice of this invention, as well as other solvents in which the cyano-substituted polyvinyl acetal is soluble, especially desirable results have been obtained wherein nitromethane was employed as the solvent. The reaction presure is not critical and need only be sufficient to maintain the aldehyde or acetal and the solvent, if employed, substantially in the liquid phase.

In a preferred embodiment the cyano-substituted polyvinyl acetal product which is dissolved in the reaction mixture is separated by precipitation through the addition of a substance such as diethyl ether which is miscible with the reaction solvent but in which the cyano-substituted polyvinyl acetal is substantially insoluble. If desired, purification of the separated cyano-substituted polyvinyl acetal can be achieved by dissolving the crude polymer product in a solvent, such as acetone, followed by precipitation through dilution with a substance, such as water.

The cyano-substituted polyvinyl acetals of this invention are useful as adhesives, coatings, films, specialty dielectrics, and the like. The high tensile strength of these polymers is quite desirable, and the combination of high dielectric constant and low dissipation factor exhibited by the polymers make them valuable as matrices for electroluminescent devices, e.g., for lighting panels for home and industrial use. The cyano-substituted polyvinyl acetals can be used as adhesives in the bonding of a variety of materials including metals such as aluminum, magnesium, copper, iron, steel, brass, and bronze; thermoplastic and thermosetting resins such as polyamides, polystyrene, polyvinyl chloride, polyolefins, polyesters, epoxies, and phenolics; glass and other ceramics; wood; leather; paper; and the like.

The following examples more fully describe the present invention. However, it is to be understood that the examples are merely illustrative of the invention and are not to be construed as unduly limiting the invention.

EXAMPLE I

To a mixture of 1300 ml. of nitromethane and 8 g. of concentrated sulfuric acid in a 2-liter flask equipped with stirrer and condenser was added 130 g. of 4,4-dimethoxybutyronitrile. To the stirred mixture at about 90–100° C. was added over a period of approximately 30 minutes 80 g. of polyvinyl alcohol (Elvanol 72–60 polyvinyl alcohol; Du Pont). The resulting mixture was stirred at about 90–100° C. for approximately 6 hours, after which it was allowed to stand at about 25° C. for approximately 15 hours. The reaction mixture was then diluted with ether to precipitate the polyvinyl 4-cyanobutyral, which was dissolved in acetone and reprecipitated by the addition of water to the acetone solution. The polymer product was then washed with hot methanol and with ether, after which it was dried at 100° C. under vacuum. The resulting dried polyvinyl 4-cyanobutyral weighed 99.5 g. and contained 8.4 percent nitrogen, indicating that approximately 85 percent of the hydroxyl groups in the polyvinyl alcohol used as a starting material was converted to the acetal structure. This product was combined with additional polyvinyl 4-cyanobutyral similarly prepared in another run for evaluation in Example II.

EXAMPLE II

Mechanical and electrical properties were determined on compression molded slabs of the polyvinyl 4-cyanobutyral of Example I. For comparative purposes, these mechanical and electrical properties were also determined on compression molded specimens of a commercially available polyvinyl butyral (Butvar B–76 resin; Monsanto) having a butyral content, expressed as percent polyvinyl butyral, of approximately 88 percent. Compression molding of the polyvinyl 4-cyanobutyral and of the polyvinyl butyral was carried out at 150–160° C. under a pressure of approximately 2000 p.s.i. Moldings were cooled below 70° C. before the molding pressure was released.

Tensile strength and elongation at room temperature were determined by the method of ASTM D638–56T on die-cut dumbbell speciments obtained from molded slabs of approximately 0.075-inch thickness. Mechanical tests were performed on an Instron Model TT testing machine at a constant strain rate of 0.5 inch per minute. Dielectric constant and dissipation factor were determined at room temperature and one kilocycle by the method of ASTM D150–59T. Dielectric strength as breakdown voltage per mil was determined at room temperature under a constant voltage increase rate of 500 volts per second by the method of ASTM D149–59. The results of these tests are summarized in the following table.

| | Polyvinyl 4-cyanobutyral | Polyvinyl butyral |
|---|---|---|
| Tensile yield, p.s.i. | 7,780 | 5,770 |
| Tensile maximum, p.s.i. | 6,465 | 3,875 |
| Ultimate elongation, percent | 125 | 190 |
| Dissisipation factor at 1 kc | 0.014 | 0.00008 |
| Dielectric constant at 1 kc | 7.60 | 3.03 |
| Dielectric strength, volts/mil | 330 | 660 |

The above data show that the polyvinyl 4-cyanobutyral had substantially greater tensile strength than did the polyvinyl butyral. The combination of high dielectric constant and relatively low dissipation factor observed for the polyvinyl 4-cyanobutyral constitute a balance of properties useful in specialty materials such as matrices for electroluminescent devices.

EXAMPLE III

Polyvinyl 4-cyanobutyral prepared in a manner similar to that described in Example I was studied as a bonding agent between aluminum (2024T alloy) coupons previously subjected to vapor degreasing and acid pickling. The bonding agent was hot pressed between the coupons at a maximum temperature of 200° C. The lap shear strength and ultimate shear strain of the specimen determined at room temperature (about 25° C.) by the method of ASTM D1002–53T, were 890 p.s.i. and 0.018 inch, respectively.

The foregoing detailed description has been given for clearness and understanding and no unnecessary limitations are to be understood therefrom. The invention is not limited to the exact details and description shown for obvious modifications will occur to those skilled in the art

What is claimed is:

1. A process for producing cyano-substituted polyvinyl acetals comprising:
   (a) admixing a cyano compound having the general formula $XCHR_nCN$ where X is selected from oxygen and $(R'O)_2$, $n$ is 0 or 1, R is a divalent hydrocarbon radical selected from the group consisting of unsubstituted and alkyl-, cycloalkyl-, and aryl-substituted alkylene, cyloalkylene, arylene, alkenylene, and cycloalkenylene, including alkylene in which one methylene group is replaced by a cycloalkylene or arylene group, said R contains from 1 to about 16 carbon atoms, inclusive, and said R' is selected from the group consisting of alkyl, cycloalkyl, aryl, and combinations thereof, said R' contains from 1 to about 8 carbon atoms, inclusive, with a polyvinyl alcohol consisting principally of $-CH_2CHOH-$ radicals in the presence of an acid catalyst selected from the group consisting of mineral and organic acids and in the presence of a saolvent selected from the group consisting of nitro compounds having 1 to 8 carbon atoms, inclusive, N-hydrocarbyl amides and N,N-dihydrocarbyl amides having 2–12 carbon atoms, inclusive, and ethers having 4–16 carbon atoms, inclusive, to form a reaction mixture;
   (b) maintaining said reaction mixture at a temperature within the range of about 0–300° C. and at a pressure sufficient to maintain said reaction mixture in a liquid phase.

2. A process according to claim 1 wherein said $XCHR_nCN$ is present in an amount in the range of about 0.3 to 1.5 mols per mol of $-CH_2CHOH-$ unit in said polyvinyl alcohol, said catalyst is present in the range of about 0.5 to 10 weight percent of said $XCHR_nCN$ and said reaction mixture is maintained at a temperature within the range of about 20–150° C.

3. A process according to claim 2 wherein said $XCHR_nCN$ is present in an amount in the range of about 0.4 to about 0.7 mol per mol of $-CH_2CHOH-$ unit in said polyvinyl alcohol.

4. A process according to claim 1 to include the step of admixing a solvent in which said cyano-substituted polyvinyl acetyl is soluble with said cyano compound said, polyvinyl and said acid catalyst.

5. The process according to claim 4 wherein said nitro compounds are selected from the group consisting of nitromethane, nitroethane, 2-nitropropane, nitrocyclohexane, and nitrobenzene.

6. The process according to claim 5 wherein said nitro compound is nitromethane.

7. The process according to claim 4 wherein said amide is selected from the group consisting of N,N-dimethylformamide, N,N-diethylacetamide, and N-methylprrolidone.

8. The process according to claim 4 wherein said ether is selected from the group consisting of tetrahydrofuran, dioxane and dimethyl ether of ethylene glycol.

9. The process according to claim 1 wherein said acid catalyst is a mineral acid selected from the group consisting of sulfuric acid, hydrochloric acid, and phosphoric acid.

10. The process according to claim 1 wherein said acid is an organic acid selected from the group consisting of trichloroacetic acid, benzenesulfonic acid, and p-toluenesulfonic acid.

11. A process for producing polyvinyl 4-cyanobutyral according to claim 1 comprising admixing 4,4-dimethoxybutyronitrile and a polyvinyl alcohol in the presence of sulfuric acid catalyst and nitromethane solvent to form a mixture, maintaing said mixture at a temperature in the range of about 0–200° C. for a period of time sufficient to allow said polyvinyl 4-cyanobutyral to be formed and at a pressure sufficient to maintain said mixture substantially in a liquid phase, said 4,4-dimethoxybutyronitrile being present in an amount in the range of about 0.4 to 0.7 mol per mol of $-CH_2CHOH-$ unit in said polyvinyl alcohol and said sulfuric acid catalyst being present in an amount in the range of about 0.5 to 10 weight percent of said 4,4-dimethoxybutyronitrile; cooling the reaction mixture; diluting the reaction mixture with diethyl ether to precipitate said polyvinyl 4-cyanobutyral; separating said polyvinyl 4-cyanobutyral; dissolving said polyvinyl 4-cyanobutyral in acetone to form an acetone solution; reprecipitating said polyvinyl 4-cyanobutyral by adding water to said acetone solution; separating said reprecipitated polyvinyl 4-cyanobutyral; washing said reprecipitated polyvinyl 4-cyanobutyral with hot methanol and then with diethyl ether; and drying said polymer to recover a substantially pure polyvinyl 4-cyanobutyral.

12. A cyano-substituted polyvinyl acetal produced according to the process of claim 1.

13. A cyano-substituted polyvinyl acetal produced according to the process of claim 12.

References Cited

UNITED STATES PATENTS

| 2,341,553 | 2/1944 | Houtz | 260—91.3 |
| 2,697,088 | 12/1954 | Stanin et al. | 260—32.6 |
| 2,680,733 | 6/1954 | Martin | 260—66 |
| 3,071,429 | 1/1963 | Ohno et al. | 260—73 XR |

WILLIAM H. SHORT, Primary Examiner

L. M. PHYNES, Assistant Examiner

U.S. Cl. X.R.

260—91.3